F. E. IVES.
COLOR PHOTOGRAPHY.
APPLICATION FILED MAR. 11, 1914.

1,238,775.

Patented Sept. 4, 1917.

Attest:
E. Mitchell
M. Tucker

Inventor:
Frederic E. Ives,
by Rogers, Kennedy & Campbell
his Attys.

UNITED STATES PATENT OFFICE.

FREDERIC E. IVES, OF WOODCLIFF-ON-HUDSON, NEW JERSEY.

COLOR PHOTOGRAPHY.

1,238,775.      Specification of Letters Patent.      Patented Sept. 4, 1917.

Application filed March 11, 1914. Serial No. 823,840.

*To all whom it may concern:*

Be it known that I, FREDERIC EUGENE IVES, a citizen of the United States, residing at Woodcliff-on-Hudson, in the county of Bergen and State of New Jersey, have invented certain new and useful Improvements in Color Photography, of which the following is a specification, reference being had therein to the accompanying drawing.

This invention relates to color photography and to all branches of that subject, including both the taking and the exhibiting of color photographs, either of stationary subjects, or pertaining to motion pictures in color. More particularly the invention relates to the optical means employed for securing and for projecting or otherwise exhibiting the pictures, especially where what may be termed simultaneous pictures or images are involved; for example, three or two images of the subject simultaneously exposed under color selective conditions.

The general object of the present improvement is to increase the effectiveness of such apparatus, more especially by reducing the loss and thereby increasing the amount of light utilized, resulting, in the taking of pictures by a camera, in materially reducing the time of exposure and thereby increasing the available range of subjects.

Where simultaneous images are involved, it has heretofore been proposed to employ an ordinary plate of glass, white or colored, and arranged diagonally so that a beam of light directed thereupon is partly transmitted, the balance being reflected, thus giving a separation of the beam into two components, which may be directed to different sensitive films for producing the simultaneous images; the reverse principles permitting the light from two images to be blended. A comparatively small percentage of the light is reflected and the bulk transmitted, but, this disproportion can be equalized by an extremely thin silver or platinum deposit, which decreases the transmission and increases the reflection, although absorbing a fraction of the light energy.

The action of the transparent reflector is at its first reflecting surface to divide the white light into two parts, and it thereby divides each of the component colors, red, green, blue, etc., into two portions, so that eventually when the red portion of the light beam, for example, reaches its destination, it has been reduced by the transparent reflector to a half or less of its original quantity, in addition to any other losses necessarily occurring in the apparatus. In other words, the immediate action of the transparent reflector is to throw away an exceedingly large percentage of the available light.

It is an object of this invention to do away with such losses of light by employing in the color photography apparatus, of whatever kind, a dichroic optical instrument, or what may be more specifically defined as a color selective transparent reflector, which would be substituted in the place of the transparent reflectors heretofore used. The dichroic reflector, as will be more fully hereinafter explained, will be adapted to split or separate the light beam by reflecting an excess or preponderance of one kind of light and transmitting an excess or preponderance of another kind, this action occurring at the surface of the instrument, and being independent of the subsequent interposition in the light beam of color screens.

This dichroic reflector is found to be much more efficient than the plain glass reflector, and also more efficient than such substitutes as thin or parti-silvered or platinized glass, none of which effect a resolution of white light into complementary components, but all of which throw away a large proportion of the available light.

Other and more specific objects of this invention will be illustrated as the hereinafter following detailed description proceeds.

To the attainment of the objects above referred to the present invention consists in the novel arrangements, combinations, apparatuses, instruments and other features illustrated and described, and more particularly to the dichroic reflector in combination with the other optical elements.

Hereinafter will first be described various illustrations and embodiments of the present invention, and thereafter the features of novelty will be set forth in the appended claims. Since the operation and uses of the invention may be more easily described by diagrams, these have been included as a part hereof and will now first be referred to.

Figure 1 diagrammatically shows the action of a parti-silvered transparent reflector upon a beam of light, partly transmitting and partly reflecting each constituent of the beam.

Figure 5:
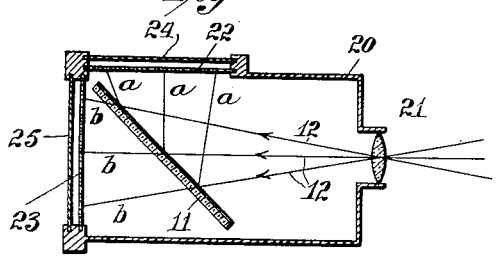

Fig. 5 diagrammatically illustrates a simple practical application of this invention in color photography, showing an apparatus adapted either for taking or for exhibiting color photographs.

Figure 4:
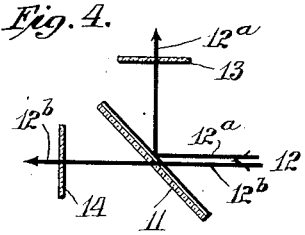
Figure 6:
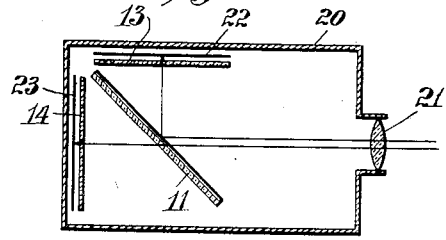

Fig. 6 is a diagram showing a modified camera or color photograph taking apparatus including not only a dichroic optical instrument or reflector, but also rectifiers or color screens analogous to those in Fig. 4.

Figure 7:
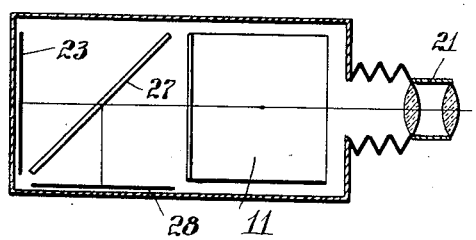

Fig. 7 shows a three-color camera employing the improvement.

Figure 8:
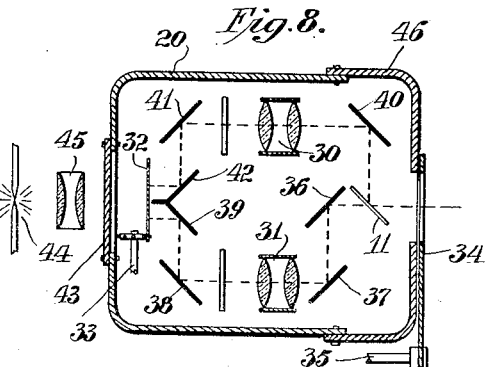

Fig. 8 shows an embodiment of the invention applied to the art of motion pictures in color, which is a branch of color photography.

In the diagrams the thickness of the glass and any refraction thereby are ignored as negligible, the first glass surface being the reflecting one in each case. Also the incident light in each case is assumed to be white, as covering all possible circumstances, and the beam of white light is treated as composed simply of two complementary colors, red and green, or three, red, green and blue.

Figure 1:
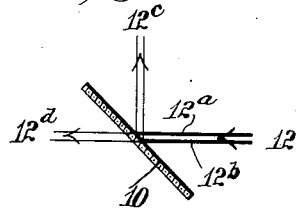
Figure 2:
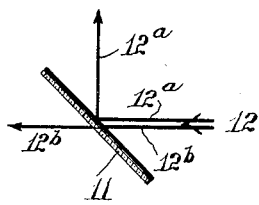
Fig. 2 shows the different action upon a beam of light of a theoretically perfect color selective or dichroic transparent reflector.
Figure 3:
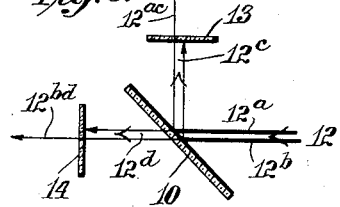
Figs. 3 and 4 are diagrams corresponding to Figs. 1 and 2 but with color screens interposed in the transmitted and reflected beams respectively.

The nature of the dichroic optical instrument and its operation may be first best explained by reference to the diagrams Figs. 1 to 4. In Figs. 1 and 3, 10 is a glass reflector silvered or platinized to equally reflect and transmit, while in Figs. 2 and 4, 11 is the dichroic or color-selective transparent reflector. The beam of light 12 strikes the reflector diagonally in each case. Considering the beam as one of white light, it is made up of all of the constituents of the spectrum, but for convenience these may be grouped into two complementary components, $12^a$ and $12^b$, which, added together, constitute white light.

In Fig. 1 the beam on striking the plain reflector is partly reflected as to all its constituents, giving a weakened or half strength beam $12^c$ composed of a portion of the rays $12^a$ and a portion of the rays $12^b$. The transmitted portion $12^d$ similarly comprises a part of $12^a$ and a part of $12^b$. Therefore there is no color selection but merely a division of the entire light into two similar portions respectively reflected and transmitted.

In Fig. 2 the transparent reflector 11 is provided with a dichroic surface. If this were theoretically perfect the action would be as shown, the component $12^a$ being reflected *in toto* and the rays $12^b$ transmitted *in toto*, thus giving an effective color separation or selection, for example, the greens $12^a$ of the spectrum may be reflected and the reds $12^b$ transmitted.

In Figs. 3 and 4 colored screens or transparent colored glasses have been interposed in the reflected and transmitted rays. Assuming 13 to be a green screen, then in Fig. 3 the reflected portion of the green rays $12^a$ will pass through the screen 13, while the red rays $12^b$ will be cut off by it and wasted. Conversely as to the transmitted rays $12^d$, the red component $12^b$ thereof will pass through the red screen 14 as seen at $12^{bd}$, while the green component $12^a$ will be cut off thereby. As a result, approximately speaking, the finally reflected rays $12^{ac}$ will consist of merely half the original green component $12^a$ of the white light, while the finally transmitted rays $12^{bd}$ consist of but half of the original red portion $12^b$ of the white light. Losses will reduce the eventual rays to less than 50%.

In Fig. 4, however, the interposition of the green and the red screens 13 and 14 respectively effects no substantial cutting off of light, but only a rectification in case of a slight difference between the color qualities of the dichroic instrument 11 and the screens respectively. Theoretically, therefore, all of the green rays $12^a$ are reflected from the instrument 11 and are transmitted through the screen 13, while the balance of the light is transmitted through the instrument 11 and screen 14 so that the finally emerging rays constitute, without waste, the entire make-up of the original white light.

These principles are applicable to the art of color photography in the specific modes hereinafter referred to or in an indefinite further variety of ways which will be readily suggested to those skilled in the art.

A dichroic optical instrument or color-selective transparent reflector approximating the theoretical operations and results above referred to may be produced in one or more of the modes below described and when so produced will give the useful results as specified. Still other modes of making the dichroic reflector may be employed.

One mode of manufacturing such a dichroic reflector is by the use of certain coal-tar dyes, preferably the alkaline or basic coal-tar dyes. Such a reflector made with a suitable coal-tar dye gives greater efficiency than a reflector made from metallic gold as hereinbelow set forth. The coal-tar dye is preferably used in alcoholic solution and in that condition applied to the first or front surface of a perfectly clean glass plate of suitable quality. The dye that it is preferred to use is eosin, although fuchsin and other coal-tar dyes would be available, and good results have been obtained from sodium di-bromfluorescinate mixed with eosin. Dyes of different colors would give different kinds of separation but it has been found that in any case the sum of the reflected rays is in color substantially the complement of the sum of the transmitted rays. After flowing the plate with the solution it should be allowed to drain, and to dry in upright position, standing upon an absorbent material, such as blotting paper.

As a specific example, a solution may be employed containing in the neighborhood of 20 gr. eosin to 8 oz. alcohol. After flooding and draining as described, the drying may be allowed to proceed slowly, protected within a closed box, in which is provided a supply of calcium chlorid for the purpose of keeping the contained air as dry as possible.

Dichroic coatings thus produced are found to be satisfactorily uniform, excepting the lowermost margin of the plate, which may be discarded. They are fairly hard and durable, especially in dry air, if protected from continuous exposure to strong light; and if injured are so easily and cheaply replaced as to make their regular employment eminently practicable.

A coating so produced by the use of eosin will so act upon white light as to reflect a preponderance or excess of green, giving an appearance like a hard polished green metal, while likewise a preponderance or excess of red is transmitted. This increases the speed efficiency of the camera, especially since red is the least actinic color and the recording of the red is the time consuming operation.

Theoretical comparison may be made between the relative action of clear glass, half silvered glass, and the eosin dichroic reflector as between the transmitted and the reflected portion of the light by the following table which approximates the actual results.

|  | Transmitted. | Reflected. |
|---|---|---|
| Clear glass | 90 R* | 10 R |
|  | 90 G | 10 G* |
|  | 90 B | 10 B |
| Half silvered glass | 50 R* | 50 R |
|  | 50 G | 50 G* |
|  | 50 B | 50 B |
| Eosin dichroic reflector | 80 R* | 20 R |
|  | 50 G | 50 G* |
|  | 80 B | 20 B |

Assuming the transmitted red and the reflected green light is to be utilized, the above table indicates that clear glass will give 90% of the red and 10% of the green light; half silvered glass 50% of the red and 50% of the green light; eosin dichroic reflector 80% of the red and 50% of the green light. In each case losses will reduce the figures given but the dichroic reflector clearly affords an increased proportion or preponderance of the respective colors.

Another dichroic coating, less delicate and more durable, although not so efficient as the coal-tar dye reflector, is one on which, at the first or front surface of the glass plate, is deposited a thin film of pure gold. A properly made dichroic reflector of this kind will reflect more than half of the orange-red light, and transmit more than half of the green light. The gold film should be exceedingly thin and may be electrically deposited in a vacuum.

When a thin gold deposit is used, as a dichroic reflector, it may be employed in making up a compound prism, for example, of the kind referred to in prior Patent No. 703,929, of July 1, 1902, the ruddy reflecting surface being used for sending light through a red screen while the greener transmitted light is passed through a green screen.

In the light of the particular disclosures hereinafter made, many other practical applications of this invention will suggest themselves to those skilled in the art. Color photography cameras are already known wherein two or more separate negatives are simultaneously exposed through different color screens, and such cameras have been frequently provided with one or more diagonal transparent reflectors which transmit part of the light and reflect part to another plate, for example, see U. S. Patents Nos. 475,084 of May 17th, 1892; 531,040 of December 18th, 1894; 546,889 of September 24th, 1895; 655,712 of August 14th, 1900; 660,442 of October 23rd, 1900; 668,989 of February 26th, 1901 and 980,961 of January 10th, 1911. Where, in such cameras it was desired to utilize only the first glass surface for reflection in order to avoid double reflection, and therefore double outlines, the transparent reflector was constituted of colored glass as specified, for example, in claim 9 of Patent No. 531,040, and another expedient to prevent such double reflection is shown in Patent No. 703,929 of July 1, 1902. None of these recited patents, however, disclose or suggest a dichroic reflector, and the reflected image in each case was simply a reduced portion or percentage of all of the constituents of the original beam of light. It is believed, however, that the present invention would be applicable in connection with the structures of any of these prior patents to effect an increase in efficiency therein.

Simple forms of illustrative embodiments are shown in Figs. 5, 6, 7 and 8 herein.

The color photography apparatus of Fig. 5 may be employed either for taking or exhibiting color photographs. While truer color effects may be reproduced on the tri-color system involving the three primary colors, red, green and blue, approximate results are attainable with two colors which, for convenience, may be termed red and green, although obviously the colors might be different. Assuming the two-color system, the dichroic reflector 11 is shown inclosed in a box or casing 20 having a lens 21 at the front, positioned to throw light rays 12 diagonally upon the reflector. As in Fig. 2, one of the color components of the light will be reflected laterally to where it may be received upon a sensitive film 22, while the complementary portion of the light will be transmitted through the instrument 11 and pass to the sensitive film 23. In this way color-selection negatives are obtained from which positives may be produced and the proper colors blended in any well known manner to give the true colors of the original subject.

Considering the structure of Fig. 5 as an exhibiting instrument either for viewing or projecting, the films 22 and 23 may be considered as positives and the walls 24 and 25 back of them changed from opaque to translucent so that an observer or curtain in front of the lens will receive a combined color impression.

The color-selective screens 13 and 14 may be omitted as in the embodiment of Fig. 5, but it is preferred to employ them. Thus Fig. 6 shows a camera having the dichroic reflector 11, the screens 13 and 14 and the films 22 and 23 behind them respectively. In case of difficulty in securing a dichroic reflector giving exactly the shades of reflected and transmitted light desired, the screens 13 and 14 are of value as rectifying the light or, in other words, sifting out such undesired rays as have not been eliminated. As illustrated in Fig. 4, as compared with Fig. 3, a greater amount of the respective colored light will reach each of the films 22 and 23 with the dichroic reflector and screens, as in Fig. 6, than with a plain or parti-silvered transparent reflector and screens as in prior known apparatuses.

Obviously the color screen 14 might be omitted by constituting the glass base of the dichroic reflector 11 of the proper color, since that would effect the proper sifting or rectifying of the selected transmitted rays.

In a broad aspect, the art of motion pictures in color is merely the art of color photography applied to traveling films and intermittent shutters. In Fig. 8 is shown a simple diagram indicating one use of the present invention for motion pictures in color. Within the casing 20 is the dichroic transparent reflector 11, serving not only to separate the component colors of the light, but to relatively displace the images formed therefrom. Instead of one lens in front of the apparatus, a pair of lenses 30, 31 in the separated light beams may be employed, serving to focus the rays, which are eventually brought to the traveling film 32, forming images placed side by side on the film. Mechanism 33 for intermittently advancing the film, and a shutter 34 intermittently advanced by mechanism 35, will be suitably operated in unison in a well known manner, so that the film travels between exposures and preferably remains stationary during exposures. The light displacing devices may include a pair of silvered mirrors, 36, 37 between the instrument 11 and the lens 31 and another pair thereof 38, 39 between the lens and the film, and if both branches of the light beam are displaced, as is advisable in order to maintain equal optical distances, a silvered reflector 40 may coöperate with the instrument 11 to project one light portion through lens 30, there being a pair of mirrors 41, 42 for displacing the light to the film.

By this apparatus an axial light ray entering the camera in front is split, a preponderance of the green, for example, being reflected from instrument 11 and passing through lens 30 to one side of the film, while a preponderance, the red part of the light is caused to pass through lens 31, forming an image at the other side of the film. Operating the film and shutter in unison affords a series of paired color-selective images capable of being reproduced by an analogous apparatus.

For exhibiting the pictures, the rear of the box 20 may be opened at 43 and a source of light 44 and condensing lens 45 properly placed to project a beam of light forwardly through the film. This light forms two beams, one for each image, and the two beams become displaced and then reunited and blended by the color-selective reflector 11, so that each image thrown on the curtain is the sum of the two color images. The instrument 11 may have a different character for projecting than for taking the pictures.

Motion pictures taken by the apparatus of Fig. 8 might be projected without the use of the dichroic reflector 11, namely, by removing a front portion 46 of the casing 20 and all of the optical devices in front of the lenses with the exception of the shutter 34, which would be replaced by a pair of shutters. The two lenses would throw their images on the curtain and a slight relative adjustment between the lenses can easily be made to bring them into correspondence so as to properly blend the colors.

It has been above stated that the described novel principles may be employed in a three-color camera.

The camera in Fig. 7 generally embodies the principles and arrangements as in prior U. S. application No. 721,908, filed September 23, 1912, but with the striped silvered shiftable reflector therein replaced by a stationary reflector having the dichroic qualities of the present improvement. The rays of light projected inwardly by the lens 21 first encounter the dichroic reflector 11, which is supposed to be inclined backwardly from the vertical to a 45° position. The reflector, therefore, throws vertically upward a preponderance of green rays forming a green selection image, while a preponderance of red rays are transmitted. The transmitted rays also include a sufficient proportion of blue rays to make the desired photographic impression upon a blue sensitive or ordinary rapid film. The ascending green rays may be rectified by a green glass before reaching the film that is to bear the green-selection image. The transmitted rays, however, before rectification, encounter a vertical reflector 27 inclined at 45° so as to reflect an image laterally to the blue sensitive film 28, while the bulk of the light is transmitted and is suitably rectified in passing to the red sensitive film 23 at the rear. It is preferred to constitute the vertical reflector 27 of yellow glass to prevent double reflection to the film 28. A dichroic reflector might be employed in place of the yellow glass 27, capable of transmitting the red and reflecting a preponderance of blue light.

To render the matter more clear and by way of explanation of the terminology in the claims, the following observations are made. It will be noted that with the dichroic instrument hereof the reflected percentage of one component color and the transmitted percentage of another color, if added together, will total more than one hundred per cent., and any optical instrument giving this result will comply with the main purposes of the present improvement. For example, suppose the instrument reflects thirty per cent. of all the green light and transmits eighty per cent. of all the red light, these two percentages total one hundred ten. Theoretically a clear glass could be thinly silvered so as to reflect twenty-five per cent. of all colors and, therefore, green, and transmit seventy-five per cent. of all colors and, therefore, red, but with such reflector the total of percentages can never exceed one hundred. By a preponderance or excess of reflected and transmitted percentages, as hereinbefore used, is meant such proportions as total above one hundred per cent. The dichroic reflector is, in a sense, a selector of colors, as contrasted with a mere colored glass which eliminates undesired colors, thereby rectifying the light by subtraction. As has been explained, the present invention is more useful for the taking or recording of color pictures, but since it could be used for combining or blending them for exhibition, the statement of claim is made to cover color-photography apparatus broadly. The films 22, 23, and 28 of Figs. 5, 6 and 7, and the two sides of the film 32 of Fig. 8, may each be termed an image surface, and it may either be an image receiving surface in a picture taking apparatus, or an image bearing surface in a picture exhibiting apparatus. In every embodiment it will be noticed that there is an image surface at each of the two opposite sides of the dichroic reflector, that is to say, the optically opposite sides, so that one carries or receives the transmitted image and the other the reflected image.

It will thus be seen that a system or method and apparatus has been described embodying the principles and attaining the objects and advantages hereof, and other advantages will be apparent to those skilled in the art. Since many matters of design, arrangement, combination, detail and other features may be variously modified without departing from the principles or sacrificing the advantages hereof, no limitation to such features is intended excepting so far as specified in the appended claims.

What is claimed is:

1. A color-photography apparatus including in combination with the image-forming means or lens, a dichroically color-selective transparent reflector interposed inclinedly in the light path, and means for positioning image surfaces at optically opposite sides of said reflector.

2. A color-photography apparatus including in combination with the image-forming means or lens, an optically accurate dichroically color selective transparent reflector consisting of a glass base provided with a superficial dichroic layer interposed inclinedly in the light path, and means for positioning suitable image surfaces at optically opposite sides of said reflector.

3. A color-photography apparatus including in combination with the image-forming means or lens, an optically accurate dichroically color selective transparent reflector consisting of a glass base provided with a superficial dichroic layer interposed inclinedly in the light path, and means for positioning suitable image surfaces at optically opposite sides of said reflector; said reflector having as to the predominant colors transmitting and reflecting capacities suitably related to the color degrees respectively of the image surfaces.

4. A color-photography camera including in combination with the image-forming means or lens, a dichroically color selective transparent reflector interposed inclinedly in the light path, means for positioning suitable sensitive surfaces at optically opposite sides of said reflector, and color rectifying means interposed between the dichroic reflector and sensitive surface.

5. A color-photography camera including in combination with the image-forming means or lens, a dichroically color selective transparent reflector consisting of a glass base provided with a superficial dichroic layer exposed at the first face of said plate and interposed inclinedly in the light path, and means for positioning at optically opposite sides of said reflector sensitive surfaces responsive to the colors predominantly transmitted and reflected respectively by said dichroic reflector.

6. A color-photography apparatus including in combination with the image-forming means or lens, a dichroically color-selective transparent reflector consisting of a glass base carrying a layer of dichroic dye and interposed inclinedly in the light path, and means for positioning image surfaces at optically opposite sides of said reflector.

7. For photographic and analogous uses a color selective transparent reflector comprising a layer of dichroic dye upon a transparent base.

In testimony whereof I affix my signature in presence of two witnesses.

FREDERIC E. IVES.

Witnesses:
DONALD CAMPBELL,
WM. J. DOLAN.